United States Patent [19]
Weirich et al.

[11] 3,840,119
[45] Oct. 8, 1974

[54] FILTERING DEVICES FOR HYDRAULIC FLUIDS

[75] Inventors: Walter Weirich, Dortmund; Harry Rosenberg, Ludinghausen; Wilhelm Mutzke, Altlunen, all of Germany

[73] Assignee: Gewerkschaft Eisenhutte Westfalia, Westfalia, Germany

[22] Filed: Dec. 13, 1972

[21] Appl. No.: 314,639

[30] Foreign Application Priority Data
Dec. 13, 1971 Germany.............................. 2161703

[52] U.S. Cl.................... 210/90, 210/107, 210/133, 210/357, 210/396, 210/DIG. 14
[51] Int. Cl............................................. B01d 35/14
[58] Field of Search............. 210/90, 107, 130, 133, 210/138, 292, 396, DIG. 14, 357

[56] References Cited
UNITED STATES PATENTS

| | | | |
|---|---|---|---|
| 1,227,983 | 5/1917 | Vallez................................ | 210/90 X |
| 1,757,153 | 5/1930 | Thompson....................... | 210/396 X |
| 2,814,389 | 11/1957 | Hoare.............................. | 210/396 X |
| 3,229,816 | 1/1966 | Rosaen.............................. | 210/130 |
| 3,368,679 | 2/1968 | Bozek................................... | 210/90 |
| 3,598,238 | 8/1971 | Collins, Jr........................... | 210/138 |
| 3,630,363 | 12/1971 | Nash et al....................... | 210/138 X |

*Primary Examiner*—Samih N. Zaharna
*Assistant Examiner*—Robert H. Spitzer
*Attorney, Agent, or Firm*—Sughure, Rothwell, Mion, Zinn, and Macpeak

[57] ABSTRACT

A filtering device for filtering hydraulic pressure fluid and comprising a cylindrical housing containing a stack of filter plates mounted on a rotatable shaft. A series of stationary cleaning elements extend between the plates and serve to scrape off dirt from the plates when the shaft is rotated. The dirt can accumulate in a chamber beneath the filter plates and the accumulated material can be removed from the device from time to time.

A by-pass valve is connected between an inlet and an outlet and has a slider which moves against the force of a spring when the pressure acting thereon rises as a result of increasing contamination of the filter plates. The slider is coupled to a visual indicator which directly indicates the prevailing degree of contamination.

10 Claims, 3 Drawing Figures

FILTERING DEVICES FOR HYDRAULIC FLUIDS

BACKGROUND TO THE INVENTION

This invention relates to a filtering device for filtering hydraulic pressure fluid and is particularly but not solely, useful in the mining field.

Various types of filter device are known for filtering hydraulic fluid. For example, for filtering the hydraulic pressure fluid used in hydraulic mine roof support systems, filter elements of sintered material are incorporated in the hydraulic system. This simple approach suffers from the major drawback that when dirt accumulates on the filter elements an intensive throttling effect takes place with the result that hydraulic fluid may no longer be available in sufficient quantities. The filter elements are also apt to be destroyed by the high pressure of the fluid and the broken pieces of sinter material may then cause far more serious wear than that resulting from normal contamination.

Other known filters provided with an interchangeable filter element are generally unsuitable for use in underground mine workings since the elements must be physically extracted when the filters are to be cleaned and this leads to the serious danger that dirt, inevitably present in the mine environment, will find its way into the filter housing.

The so-called plate-type filters are also known for use in hydraulic systems. The plate-type filters consist of a large number of filter plates mounted one above the other to define filter gaps therebetween. The particles of dirt are filtered out of the hydraulic fluid which flows through the gaps defined by the plates. The degree of filtering is thus dependent on the width of the gaps. These filters require periodic cleaning since the material accumulating on the plates tends to drasticly increase the flow resistance.

The known filter devices which have hitherto been used in hydraulic systems, especially in mine workings, are not satisfactory from the viewpoints of efficiency, safety and reliability.

A general object of this invention is to provide an improved form of filtering device.

A further object is to provide a device of simpler and operationally reliable construction, suitable for use at high pressure in hydraulic systems in mines.

Another object is to provide a device by means by which large quantities of pressure fluid can be efficiently filtered at high pressures of the order of 300–350 atmospheres excess pressure. A further object is to provide a device which can be operated, maintained and cleaned without difficulty.

SUMMARY OF THE INVENTION

According to the invention there is provided a device for use in filtering hydraulic pressure fluid; said device comprising a housing, a removable filter assembly disposed within said housing, said assembly being composed of a stack of plates with pairs of plates defining filter gaps through which said pressure fluid flows, cleaning elements disposed in scraping relationship to the plates defining the filter gaps, and means for effecting relative movement between said plates and said cleaning elements in situ whereby to clean the plates.

Preferably a chamber is provided in the housing generally beneath said assembly to collect material removed from the filter plates and means is provided to enable removal of said collected material from the chamber.

According to a further feature of the invention there is provided an inlet to and an outlet from said device and a by-pass valve operably connected between said inlet and outlet and serving to open to establish communication directly between the inlet and outlet when the resistance to the flow of fluid through the filter assembly increases as a result of contamination of the filter plates.

Preferably there is also provided means for indicating the degree of contamination of the filter plates, said indicating means being operably connected to said by-pass valve.

The filter inlet and outlet with the by-pass valve is preferably provided at the upper end of a cylindrical main housing, which is provided with a plug or a drain valve on a base wall thereof for removal of the filtered material. The by-pass valve is advantageously carried in a replaceable cartridge and advantageously combined with the contamination or dirt indicating means to form a common constructional unit. The valve may be a spring-loaded hollow slider provided with a stem articulated or otherwise connected to visual dirt indicator.

According to a further feature of the invention the moving means for effecting scraping of the filter plates is operated automatically by a mechanism which is time-or pressure-controlled or operated in accordance with the degree in which the filter is contaminated. The slider of the by-pass valve can be directly coupled to a shaft carrying the filter plates in such a way that movement of the slider in accordance with the flow resistance of the filter, at the same time sets up the rotation of the filter assembly to effect scraping of the plates. On the other hand the slider may control a rotating means for the filter assembly, for example the slider may actuate a control valve which switches on a hydraulic rotating means driven by the high-pressure fluid itself.

Especially where the device is used with water, for example, for nozzle spray systems, the filter plates are preferably made of stainless steel and the filter housing preferably has a corrosion-proof nickel coating.

BRIEF DESCRIPTION OF DRAWINGS

The invention may be understood more readily and various other features, aspects and advantages of the invention may become more apparent from consideration of the following description.

An embodiment of the invention will now be described, by way of example only, with reference to the accompanying drawings, wherein.

DESCRIPTION OF PREFERRED EMBODIMENT

Figure 1:
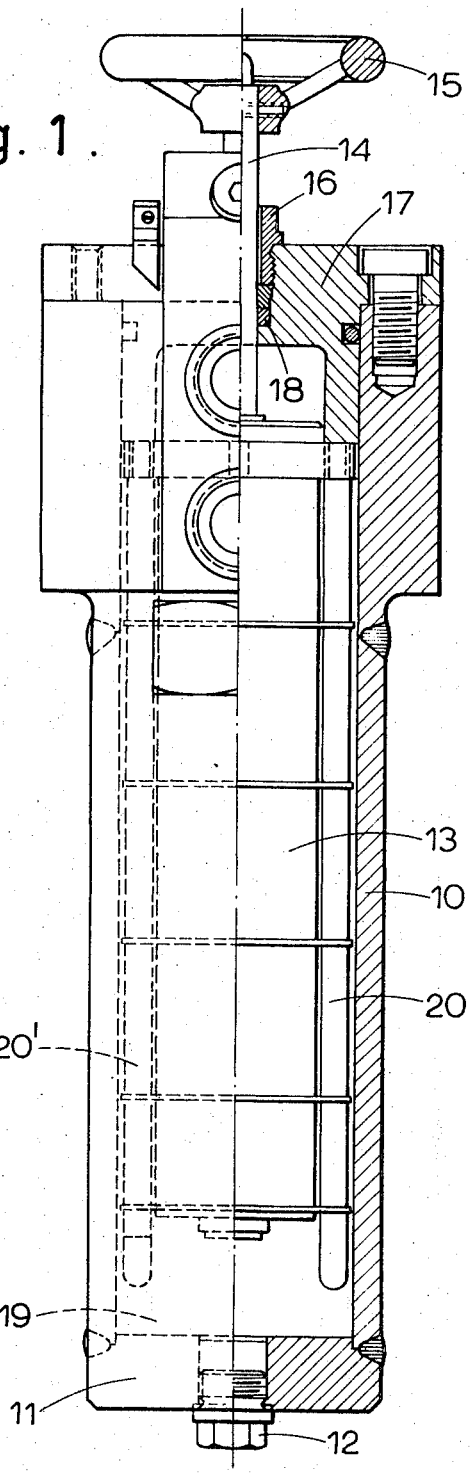
FIG. 1 is a side view, partly in cross-section, of a device made in accordance with the invention.

As shown in the FIG. 1 the device has a cylindrical housing 10 closed off at its base by a wall 11 provided with a detachable screw-threaded plug 12. The plug 12 could be replaced by a drain valve with a shut-off ball-valve or the like. The housing 10 may have a corrosive proof nickel coating especially desirable when the device is used with water as the pressure fluid. A platetype filter assembly 13 has a shaft 14 which is disposed axially central relative to the housing 10 and projects outwardly from the upper end of the housing 10. The housing 10 itself has a detachable cover 17 which locates a screw-threaded bushing 16 through which the shaft 14 is guided for rotation. A packing ring or sleeve 18 is accommodated by the cover 17 beneath the bushing 16 and seals against the outer surface of the shaft 14. The shaft 14 supports a stack of filter plates of known design, preferably made from stainless steel. The axial distance between adjacent pairs of plates defines the filtering characteristic of the assembly 13 and this distance is generally in the order of 50–100 microns providing a very fine filtering action on the fluid flowing therethrough. The construction of such platetype filters is known per se and will not be described in detail. Suffice it to say that in such filters the hydraulic fluid is made to flow radially inwards between the gaps defined by the plates and to rise at the centre of the assembly towards an outlet.

The shaft 14 may conveniently have a portion of its length of square-cross-section with each of the filter plates having a central hole of commensurate shape so as to locate on the shaft 14 for rotation therewith.

The shaft 14 is provided at its upper distal end with a handwheel 15 permitting the entire assembly 13 to be rotated about the axis of the shaft 14. Diametrically opposed cleaning elements not shown, project in the filter gaps defined between the filter plates and each of these elements has an axial thickness somewhat less than the distance between the associated pair of adjacent plates. These cleaning elements are supported by two bars 20,20' suspended from the cover 17 so that the elements remain stationary when the plates are made to rotate about the axis of the shaft 14. The interaction between the cleaning elements and the plates causes a scraping action to remove dirt or the like which has been removed from the hydraulic fluid and has accumulated on the plates. The assembly 13 can be periodically moved in this way as discussed hereinafter so that the dirt will fall into a chamber 19 formed in the housing 10 beneath the assembly 13, and in the vicinity of the base wall 11. The entire assembly 13 and the cleaning elements can be easily removed from the upper end of the housing 10 when the cover 17 is detached.

Figure 2:
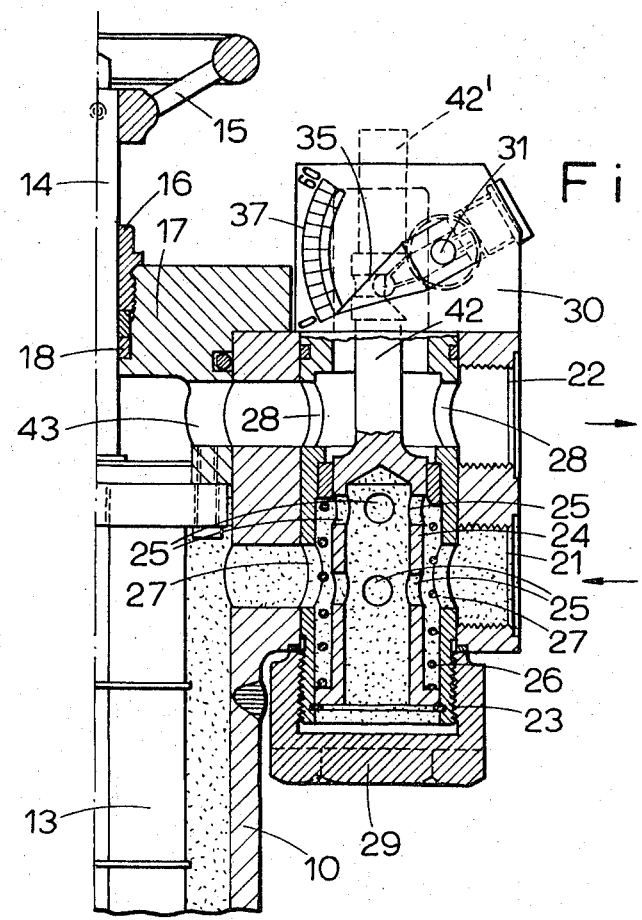
FIG. 2 is a sectional side view of part of the device showing the valve unit thereof.
Figure 3:
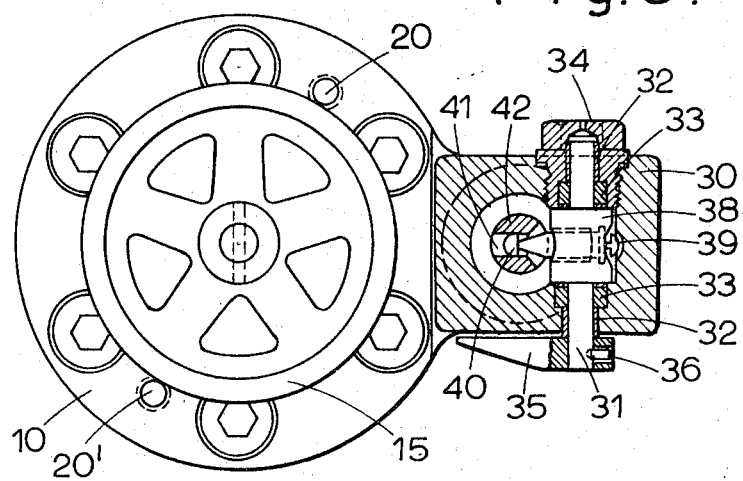
FIG. 3 is a plan view of the device.

Referring now to FIGS. 2 and 3 the device has a valve unit with a structure or body forming part of the housing 10. This body structure has a bore 21 constituting an inlet to the device and a bore 22 constituting an outlet from the device. These bores 21, 22 have threaded end portions enabling the connection of pipes or other fittings to the device. The bore 22 opens inwardly into a discharge chamber 43 in the main housing 10. The valve unit has a cartridge 23 containing a by-pass valve 24. The cartridge 23 is in the form of a sleeve located in the body structure and secured with the aid of a screw-threaded cap 29. The cartridge 23 is pierced by diametric bores 27, 28 which are coaxial with the bores 22, 21 respectively. The valve 24 is operably disposed between the bores 27, 28 and takes the form of a hollow slider mounted for slidable axial movement within the sleeve. The slider 24 has groups of axially-offset radial borings 25 therein through which direct communication can be established between the bores 27, 28 and hence the bores 21, 22 as the slider 24 is raised. The slider 24 is biased with a compression spring 26 into a closed position whereat communication between the bores 27, 28 is blocked.

Above the upper end of the cartridge 23 is a dirt-indicating means which has a housing 30 mounting a spindle 31 in bushes 32. Seals or packing rings 33 are disposed inwardly of the bushes 32 and serve to locate on the spindle 31 to seal off the interior of the housing 30. One end portion of the spindle 31 is located in a plug 34 which is screwed into a threaded hole in the housing 30. The other end portion of the spindle 31 projects outwardly from the housing 30 and carries an indicator 35 attached to the spindle 31 with a clamping screw 36. A scale 37 is attached to the housing 30 and the indicator 35 is arranged to move over the scale 37 to provide an indication of contamination as described hereinafter.

The central portion of the spindle 21 is enlarged to form a block 38. A threaded radial bore is provided in the block 38 and this bore receives a threaded member 39 having a domed guide element 40 at its outer end which slidably locates in a channel 41 extending radially of a stem 42. The channel 41 adjoins an enlarged counter bore through which an end portion of the member 38 extends. The stem 42 extends axially of the cartridge 23 and is connected to or integral with the aforesaid slider 24. By this arrangement as the slider 24 is raised against the force of the spring 26 by fluid pressure the stem 42 pivots the spindle 31 via the guide means 40, 41, 39 to cause the indicator 35 to swing over the scale 37.

The operation of the device is as follows:

The device would normally be installed at the high pressure side of a hydraulic system. The hydraulic fluid is caused to flow through the device and the filtered fluid is conveyed to the consuming appliance(s) of the system. The fluid enters the device via the inlet bore 21 and the bore 27 and the borings 25 in the valve slider 24 and hence the fluid passes into the housing 10. The fluid is then constrained to flow radially through the filter gaps between the filter plates. The now-cleaned fluid rises axially upwards of the assembly 13 to flow through the chamber 43 and hence through the outlet bore 22. The device as illustrated and described is designed for an operating pressure in the region of 300–350 atmospheres excess pressure or above at a delivery rate of about 200 litres per minute or more.

The particles of dirt etc. removed from the fluid will tend to accumulate on the filter plates thus in operation tending to increase the resistance to the flow of the fluid over a period of time. The pressure gradient between the bores 21, 22 thus tends to rise as the contamination builds up with the result that the valve slider 24 is moved against the force of the spring 26 by the increasing pressure therein, i.e. in the bore 21. When the slider 24 is raised sufficiently the bores 28, 27 are directly connected by the borings 25 in the slider 24 so that the fluid passes directly between the bores 21, 22 without passing through the filter assembly 13. The valve 24 thereby by-passes the filter assembly. The movement of the slider 24 will also cause the indicator 35 to move over the scale 37 by a corresponding amount by acting on the stem 42 and thence the spindle 31. This enables an operator to visually ascertain the degree of contamination of the filter assembly. When the indiator 35 moves a certain reading the operator can rotate the handwheel 15 to clean the filter plates. The flow resistance will then fall and the slider 24 will be returned to its former position under the action of the spring 26. The indicator 35 will then return to a null or low reading.

The substances removed from the filter plates by rotation of the handwheel 15 will fall to the lower part of the housing 10 to accumulate on the base wall 11 and in the chamber 19. From time to time the accumulation of substances can be removed from the device by removing the plug 12 or opening the shut-off valve used in the alternative. The device may also be flushed out during this operation. There is no necessity to dismantle the device for cleaning but the parts can be readily disassembled, e.g., for replacement if desired.

In a modified construction the housing 30 and associated parts are omitted and the stem 42 has an extension, denoted 42', in FIG. 2, which projects outwardly from the body structure housing the valve 24. Appropriate sealing means are provided for the extension 42'. It is apparent that the amount by which this extension 42' projects from the structure is a direct indication of the degree of contamination of the filter plates and if desired a linear scale can be provided in appropriate registration with the extension 42'.

Instead of relying on manual rotation of the handwheel 15 to effect cleaning it is clear that a mechanism can be provided to effect this. A control system relying upon the movement of the stem 42 or slider 24 for example could then be used to automatically rotate the shaft 14 a set number of times when the stem 42 or slider 24 reaches some pre-determined position. A direct control coupling via gearing, for example, could be provided between the shaft 14 and the slider 24 or stem 42. In another arrangement a control valve sensitive to the position of the slider or stem 42 can cause hydraulic fluid to drive hydraulic rotary drive means coupled to the shaft 14 when operated.

Another possibility is to effect automatic rotation of the shaft 14 by a timing device thus relying on periodic cleaning of the plates.

We claim:

1. A device for use in filtering hydraulic pressure fluid, comprising:
   a. a housing,
   b. a removable filter assembly disposed within said housing,
   c. said assembly comprising a stack of plates with pairs of plates defining filter gaps through which said pressure fluid flows,
   d. cleaning elements disposed in scraping relationship to the plates defining the filter gaps,
   e. means for effecting relative movement between said plates and said cleaning elements in situ whereby to clean the plates,
   f. an inlet to and an outlet from said device,
   g. a by-pass valve operably connected between said inlet and outlet and serving to open to establish communication directly between the inlet and outlet when the resistance to the flow of fluid through the filter assembly increases as a result of contamination of the filter plates,
   h. said by-pass valve being in the form of a spring-loaded hollow slider provided with groups of axially offset radial bores and subjected to the pressure of the fluid at said inlet in opposition to the force of said spring, and
   i. means for indicating the degree of contamination of the filter plates including a stem connected to the slider of the by-pass valve and projecting exteriorly of the housing of the device.

2. A device according to claim 1, wherein a chamber is provided in the housing generally beneath said assembly to collect material removed from the filter plates and means is provided to enable removal of said collected material from the chamber.

3. A device according to claim 1, wherein the housing is cylindrical and has a detachable cover, the plates are carried by a shaft for rotation therewith, said shaft extending through the cover and the cleaning elements are supported by said cover.

4. A device according to claim 1, wherein said by-pass valve is located in a removable cartridge.

5. A device according to claim 1, wherein the filter plates are made from stainless steel and the housing has a corrosion proof nickel coating.

6. A device for use in filtering hydraulic pressure fluid, comprising:
   a. a housing,
   b. a removable filter assembly disposed within said housing,
   c. said assembly comprising a stack of plates with pairs of plates defining filter gaps through which said pressure fluid flows,
   d. cleaning elements disposed in scraping relationship to the plates defining the filter gaps,
   e. means for effecting relative movement between said plates and said cleaning elements in situ whereby to clean the plates,
   f. an inlet to and an outlet from said device,
   g. a by-pass valve operably connected between said inlet and outlet and serving to open to establish communication directly between the inlet and outlet when the resistance to the flow of fluid through the filter assembly increases as a result of contamination of the filter plates,
   h. said by-pass valve being in the form of a spring-loaded hollow slider provided with groups of axially offset radial bores and subjected to the pressure of the fluid at said inlet in opposition to the force of said spring,
   i. means for indicating the degree of contamination of the filter plates comprising a spindle, means coupling the spindle to the slider of the by-pass valve to cause the spindle to pivot as the slider moves axially, and
   j. a visual indicator connected to move in accordance with pivotable movement of the spindle.

7. A device according to claim 6, wherein a chamber is provided in the housing generally beneath said assembly to collect material removed from the filter plates and means is provided to enable removal of said collected material from the chamber.

8. A device according to claim 6, wherein the housing is cylindrical and has a detachable cover, the plates are carried by a shaft for rotation therewith, said shaft extending through the cover and the cleaning elements are supported by said cover.

9. A device according to claim 6, wherein said by-pass valve is located in a removable cartridge.

10. A device according to claim 6, wherein the filter plates are made from stainless steel and the housing has a corrosion proof nickel coating.

* * * * *